Nov. 30, 1926.                                                              1,608,618
S. F. RICHARDS
WATER RELIEF VALVE
Filed June 21, 1926

INVENTOR
Samuel F. Richards
by
James C. Bradley
atty

Patented Nov. 30, 1926.

1,608,618

UNITED STATES PATENT OFFICE.

SAMUEL F. RICHARDS, OF PITTSBURGH, PENNSYLVANIA.

WATER RELIEF VALVE.

Application filed June 21, 1926. Serial No. 117,269.

Figure 3:
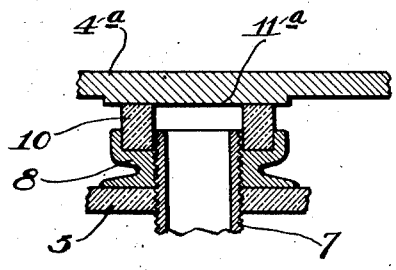
Figure 1:
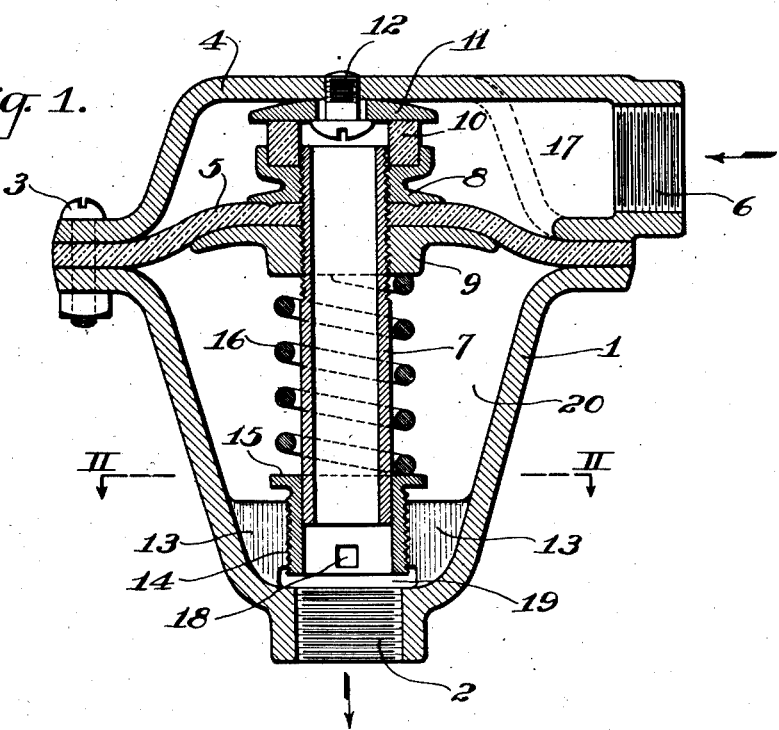
Figure 2:
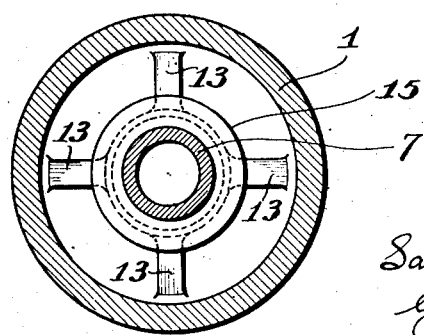

The invention relates to pressure relief valves, designed primarily for use in hot water heating systems, but not limited to use in that particular relation. It has for its principal objects, the provision of a relief valve of very simple cheap construction having a minimum number of parts and not liable to get out of order under long continued service. Further objects are the provision of a valve in which the tendency of sediment or foreign substances to collect around the seat and thus cause sticking or imperfect closure is very largely avoided, and in which all danger of the valve becoming locked shut through a failure of the spring or other parts is entirely eliminated. Other objects and advantages, incident to the structure will be readily apparent to those skilled in the art. Certain embodiments of the invention are illustrated in the accompanying drawings, wherein:

Figure 1 is a vertical section through one embodiment of the valve. Fig. 2 is a section on the line II—II of Fig. 1. And Fig. 3 is a fragmentary section showing a modified valve seat construction.

Referring to the drawings, 1 is the valve casing having the outlet opening 2 to which a suitable pipe may be connected leading to the floor of the cellar or basement, or to a drain. Clamped to the top of the casing by means of the series of bolts 3, is the cap 4, a diaphragm 5 of rubber or other suitable flexible material having its edges gripped between the opposing flanges of the casing and cap. This cap is provided with an inlet 6 connected by a suitable pipe with one of the mains of the heating system.

Extending through the diaphragm 5, is the hollow stem 7 of brass or other suitable metal. The upper end of the stem is connected to the diaphragm by means of the metal collars 8 and 9, screw threaded onto the stem, and clamping the diaphragm therebetween. The collar 8 is recessed, as shown, and carries a valve ring 10 of rubber fiber, or other suitable composition. This disc engages the valve seat or disc 11, secured to the cap 4 by means of the screw 12. The screw fits loosely in the seat 11, and has its upper face convex, so that the lower face of the seat can accommodate itself to the valve disc, in case such disc or the stem carrying it should become slightly tilted, due to wear or accident or to foreign matter becoming interposed between the valve disc and its seat.

Projecting inward from the casing adjacent the outlet 2 are the lugs 13, in which is screw threaded the adjusting sleeve 14, having at its upper end the flange 15. The lower end of the valve stem 7 is guided in the sleeve 14, and a spring 16 is interposed between the flange 15 and the collar 9. The sleeve serves as an adjusting means for varying the tension of the spring, so that the valve may be adjusted to open when the pressure in the chamber 17 reaches the predetermined point, which it is desired shall not be exceeded in the system. In order to permit the adjusting of the sleeve from outside the casing 1, the sleeve is preferably provided with a plurality of perforations 18 adapted to be engaged by the prongs of an expanding tool or wrench, which is inserted through the outlet 2. The valve is adjusted and set before leaving the shop in which it is assembled, and after once being set, the adjusting sleeve, because of its location, is not liable to be subject to inadvised manipulation or accidental misadjustment.

Even when the sleeve is at its lowest point of adjustment, its lower end is still removed a slight distance from the end of the inlet 2, thus providing the drain ports or passageways 19 from the chamber 20 to the outlet 2. This is of advantage, in case the chamber becomes filled with water, due to a failure of the diaphragm 5 or to other leakage. Under such conditions, and without the drain ports, the valve would be locked shut, and the apparatus would no longer function as a safety device. The drain or relief ports 19 guard against this difficulty, as any water, which collects in the casing, immediately drains away by gravity.

In the modification of Fig. 3 the valve seat 11 is omitted, and the valve ring or disc 10 is caused to engage the ground seat 11ª integral with the cap 4ª. The construction is in other respects the same as that of Fig. 1.

What I claim is:

1. In combination in a relief valve construction, a casing having an outlet at its lower end, a cap fitting over the upper end of the casing and secured thereto, and having an inlet adapted to be connected to the system to be controlled, a diaphragm lying between the casing and the cap, a hollow valve stem extending vertically through the diaphragm and casing, a sleeve screw threaded into the casing in alignment with said outlet and receiving the lower end of said stem, a valve seat on the lower face of the cap, a valve ring carried by said stem and engaging said seat, and a spring surrounding the stem and lying between said sleeve and the diaphragm and causing the valve to engage said seat, a drainage port being provided from the interior of the casing to said outlet.

2. In combination in a relief valve construction, a casing having an outlet at its lower end, a cap fitting over the upper end of the casing and secured thereto, and having an inlet adapted to be connected to the system to be controlled, a diaphragm lying between the casing and the cap, a hollow valve stem extending vertically through the diaphragm and casing and discharging through said outlet, a valve seat on the lower face of the cap, a valve ring carried by said stem and engaging said seat, and a spring in the casing pressing the diaphragm upwardly and causing the valve ring to engage said seat until the pressure in the cap rises above a predetermined point, said valve seat comprising a plate loosely mounted on the cap, so that it is free to adjust itself to the face of the valve ring.

3. In combination in a relief valve construction, a casing having an outlet at its lower end, a cap fitting over the upper end of the casing and secured thereto, and having an inlet adapted to be connected to the system to be controlled, a diaphragm lying between the casing and the cap, a hollow valve stem extending vertically through the diaphragm and casing and discharging through said outlet, a valve seat on the lower face of the cap, comprising a plate convex on its upper side and loosely secured to the cap, a valve ring carried by said stem and engaging said seat, and a spring in the casing pressing the diaphragm upwardly and causing the valve ring to engage said seat until the pressure in the cap rises above a predetermined point.

4. In combination in a relief valve construction, a casing having an outlet at its lower end, a cap fitting over the upper end of the casing and secured thereto, and having an inlet adapted to be connected to the system to be controlled, a diaphragm lying between the casing and the cap, a hollow valve stem extending vertically through the diaphragm and casing, a sleeve screw threaded into the casing in alignment with said outlet and receiving the lower end of said stem, a valve seat on the lower face of the cap, a valve ring carried by said stem and engaging said seat, and a spring surrounding the stem and lying between said sleeve and the diaphragm and causing the valve ring to engage said seat, the said sleeve acting as an adjusting means for varying the tension of the spring, and a drainage port from the casing leading into said outlet being provided below the lower end of said sleeve.

5. In combination in a relief valve construction, a casing having an outlet at its lower end, a cap fitting over the upper end of the casing and secured thereto, and having an inlet adapted to be connected to the system to be controlled, a diaphragm lying between the casing and the cap, a hollow valve stem extending vertically through the diaphragm and casing, and a sleeve screw threaded into the casing in alignment with said outlet and receiving the lower end of said stem, a valve seat on the lower face of the cap, a valve ring carried by said stem and engaging said seat, and a spring surrounding the stem and lying between said sleeve and the diaphragm and causing the valve ring to engage said seat, the said sleeve acting as an adjusting means for varying the tension of the spring, and being provided upon its interior with wrench engaging means whereby the sleeve may be adjusted from the exterior of the casing.

6. In combination in a relief valve construction, a casing having an outlet at its lower end, and being provided with inwardly projecting lugs just above said outlet, a cap fitting over the upper end of the casing and secured thereto and having an inlet adapted to be connected to the system to be controlled, a diaphragm lying between the casing and the cap, a hollow valve stem extending vertically through the diaphragm and casing, a guide sleeve for the lower end of said stem threaded into said lugs, and a spring surrounding said stem and lying between the sleeve and the diaphragm, drainage ports for the casing being provided leading from the spaces between the lugs to said outlet below the sleeve.

In testimony whereof, I have hereunto subscribed my name this 18th day of June, 1926.

S. F. RICHARDS.